(12) United States Patent
Cowie et al.

(10) Patent No.: US 7,621,984 B2
(45) Date of Patent: Nov. 24, 2009

(54) ELECTROSTATIC FILTER CARTRIDGE FOR A TOWER AIR CLEANER

(75) Inventors: Ross L. Cowie, Ottawa (CA); Rudy A. Vandenbelt, Ottawa (CA)

(73) Assignee: Head waters R&D, Inc., Ottawa (CA)

( * ) Notice: Subject to any disclaimer, the term of this patent is extended or adjusted under 35 U.S.C. 154(b) by 268 days.

(21) Appl. No.: 11/765,616

(22) Filed: Jun. 20, 2007

(65) Prior Publication Data

US 2008/0314250 A1    Dec. 25, 2008

(51) Int. Cl.
*B03C 3/78* (2006.01)
(52) U.S. Cl. .................. 96/41; 95/75; 95/78; 96/50; 96/62; 96/77; 96/96; 96/98
(58) Field of Classification Search ............ 96/39, 96/41, 50, 60, 62, 77–79, 94, 96, 98; 95/74, 95/75, 78, 79
See application file for complete search history.

(56) References Cited

U.S. PATENT DOCUMENTS

| | | | |
|---|---|---|---|
| 3,495,381 A | | 2/1970 | Flanagan |
| 3,788,041 A | * | 1/1974 | Gaylord ................. 96/62 |
| 4,289,504 A | * | 9/1981 | Scholes ................. 95/73 |
| 4,349,359 A | * | 9/1982 | Fitch et al. ............. 96/90 |
| 5,433,772 A | * | 7/1995 | Sikora .................. 96/87 |
| 6,251,171 B1 | * | 6/2001 | Marra et al. ............ 96/69 |
| 6,926,762 B2 | | 8/2005 | Kim |
| 2005/0152818 A1 | * | 7/2005 | Botvinnik et al. ...... 422/186.04 |
| 2005/0183576 A1 | | 8/2005 | Taylor |
| 2006/0130657 A1 | | 6/2006 | Bohlen |
| 2006/0275651 A1 | * | 12/2006 | Furuta et al. .......... 429/45 |
| 2007/0240575 A1 | * | 10/2007 | Kiern et al. ........... 96/95 |

FOREIGN PATENT DOCUMENTS

JP      54-136476 A  * 10/1979   .................. 96/79

OTHER PUBLICATIONS

Friedrich model C-90 A product brochure believed to be available sometime in 1995.

* cited by examiner

*Primary Examiner*—Richard L Chiesa
(74) *Attorney, Agent, or Firm*—Albert Peter Durigon (57) ABSTRACT

The disclosed electrostatic precipitator cartridge for a tower air cleaner in accord with the present invention is low-cost, because it is constructed of injected molded plastics material and stamped and extruded metal components. It is easy to clean, not only because it's constitutive metal parts and plastic components are machine washable but also because the cartridge as a whole is machine washable, the pieces and components are designed and arranged to prevent intracartridge fluid buildup or retention after washing, thereby eliminating any electrical shorting or arcing or other undesirable phenomena resulting therefrom that could interfere with the operation of the electrostatic filter cartridge. It is mechanically stable and has high particulate collection efficiency because it's ionizer bars have a predetermined preferably air foil shape that provides improved ionization efficiency and that imparts improved torsion stability rendering it possible to provide taller electrostatic filter cartridges and/or greater cleaning power.

15 Claims, 11 Drawing Sheets

ELECTROSTATIC FILTER CARTRIDGE FOR A TOWER AIR CLEANER

FIELD OF THE INVENTION

This invention is drawn to the field of gas purification, and more particularly, to an electrostatic filter cartridge for a tower air cleaner.

BACKGROUND OF THE INVENTION

Air cleaners that use ionizing collectors effectively and efficiently remove dust, allergens and other particulates while they generally require no filter replacement. One commercially available ionizing air cleaner unit is the Friedrich model C-90A that includes a vertically removable electrostatic precipitator cartridge in a top loading tower shaped housing. A single fan moves air horizontally through the unit. The removable electrostatic cartridge contains parallel, generally flat collector electrodes, and emitter electrodes sandwiched between generally flat ionizer, divider bar electrodes of uniform, linear profile. Removal of the cartridge through the top loading housing allows cleaning the collector, emitter and ionizer bar electrodes removed therewith. Gravity assists the return of the cartridge to the housing after cleaning. The electrostatic precipitator cartridge is comparatively bulky, difficult to manipulate and hard to clean, requiring the use of a special cleaning solution each time it is a periodically cleaned.

United States patent application publication US 2005/0183576 A1 to Taylor et al, published on Aug. 25, 2005, discloses electro-kinetic air transporter conditioner devices each having first and second emitter and collector ionizing electrode arrays and a tower housing. The electrokinetic first and second emitter and collector electrode arrays create ions that both move the air axially between the first and second collector electrode arrays and condition the air, by cleaning the same as particulates are electrostatically attracted to the second collector electrode arrays and by adding ozone. In hybrid embodiments, one or more fans that may be vertically arrayed on the tower housing provide airflow that augments the airflow imparted by the electrokinetic air transport of the electrokinetic emitter and collector electrode arrays. The second collector electrode arrays are removable from the top of the tower housing for cleaning, but the first emitter electrodes arrays, that are not removable from the tower housing, are cleaned in situ by the use of a tool adapted to clean the wire emitter electrodes inside the tower housings.

Other electrostatic ionizing collectors and tower shaped housings are disclosed by U.S. Pat. No. 3,495,381 issued Jun. 26, 1967 to Flanagan; U.S. Pat. No. 6,926,762 B2 issued Aug. 9, 2005 to Kim et al; and United States patent application publication US 2006/0130657 A1 to Bohlen et al. In Flanagan, four (4) vertically arranged fans move air horizontally through ionizing and precipitating components carried by a tower air filtering apparatus. Kim et al. discloses first and second fans and first and second filtering units that are vertically arrayed to a tower air cleaning apparatus. Each of the first and second filtering units includes electrostatic dust filters providing ionization of dust particles. The fans move air horizontally through the tower air cleaning apparatus. Bohlen et al. discloses multiple, vertically arrayed fans moving air horizontally through an electrostatic precipitator mounted in a tower ionizer air cleaner. The utility of these electrostatic ionizing collectors and tower shaped housings has been limited by their comparative bulk, cost, particulate removal efficiency, air cleaning capacity and/or by having been difficult or toilsome to clean.

There is thus the need to provide an electrostatic filter cartridge for a tower air cleaner providing improved cleanability and particulate collection efficiency that is comparatively inexpensive to manufacture while providing a clean air delivery rate sufficient to maintain at least an average size room free of dust, dirt, allergens and other particulates.

SUMMARY OF THE INVENTION

Accordingly, it is one object of the present invention to disclose an electrostatic filter cartridge for a tower air cleaner providing improved particulate removal efficiency.

It is another object of the present invention to disclose an electrostatic filter cartridge for a tower air cleaner providing improved drainability that is machine washable.

It is another object of the present invention to disclose an electrostatic filter cartridge for a tower air cleaner that is inexpensive to manufacture while providing a clean air delivery rate (CADR) suitable to keep at least an average size room free of dust, dirt, pollen, allergens, and other particulates.

The electrostatic filter cartridge for a tower air cleaner of the present invention includes emitter and collector electrode arrays spaced apart along the airflow direction that extend between and are supported by longitudinally spaced top and bottom end caps. The emitter electrode array includes wire electrodes and ionizer bars of generally bulbous and preferably air foil shaped cross section spaced apart in a direction transverse to the airflow direction such that each wire electrode is spaced from and interdigited between laterally adjacent ionizer bars in such a way that each emitter wire confronts its lateral adjacent ionizer bars where each is of maximized cross-sectional area.

The preferably air foil shaped ionizer bars and wires of the emitter electrode array have been found to provide significantly improved particulate collection efficiency.

The collector electrode array includes parallel, interdigited preferably stainless steel collector plates or other machine washable material that may be economically fabricated out of blank sheet material such as by stamping.

The top and bottom end caps of the electrostatic filter cartridge each preferably include first walls that define an interior plenum in which water may collect during cleaning of the electrostatic filter cartridge; second walls defining first openings in fluid communication with the interior plenum out of which water that may have been collected in a plenum during machine cleaning may drain when the electrostatic filter cartridge has been upended; and third walls defining second openings in fluid communication with a plenum out of which water that may have been collected in a plenum during cleaning may drain when the electrostatic filter cartridge is in its side orientation. Although end cap walls defining plenums, drain passages and drain openings are preferred, other means to provide drainage of cleaning water when in upended or side orientations may be employed.

BRIEF DESCRIPTION OF THE DRAWINGS

These and other objects, inventive aspects and advantageous features of the present invention will become apparent as the invention becomes better understood by referring to the following, solely exemplary, detailed description of the presently preferred embodiments, and to the drawings, wherein.

DETAILED DESCRIPTION OF THE PRESENTLY PREFERRED EMBODIMENTS

Figure 1:
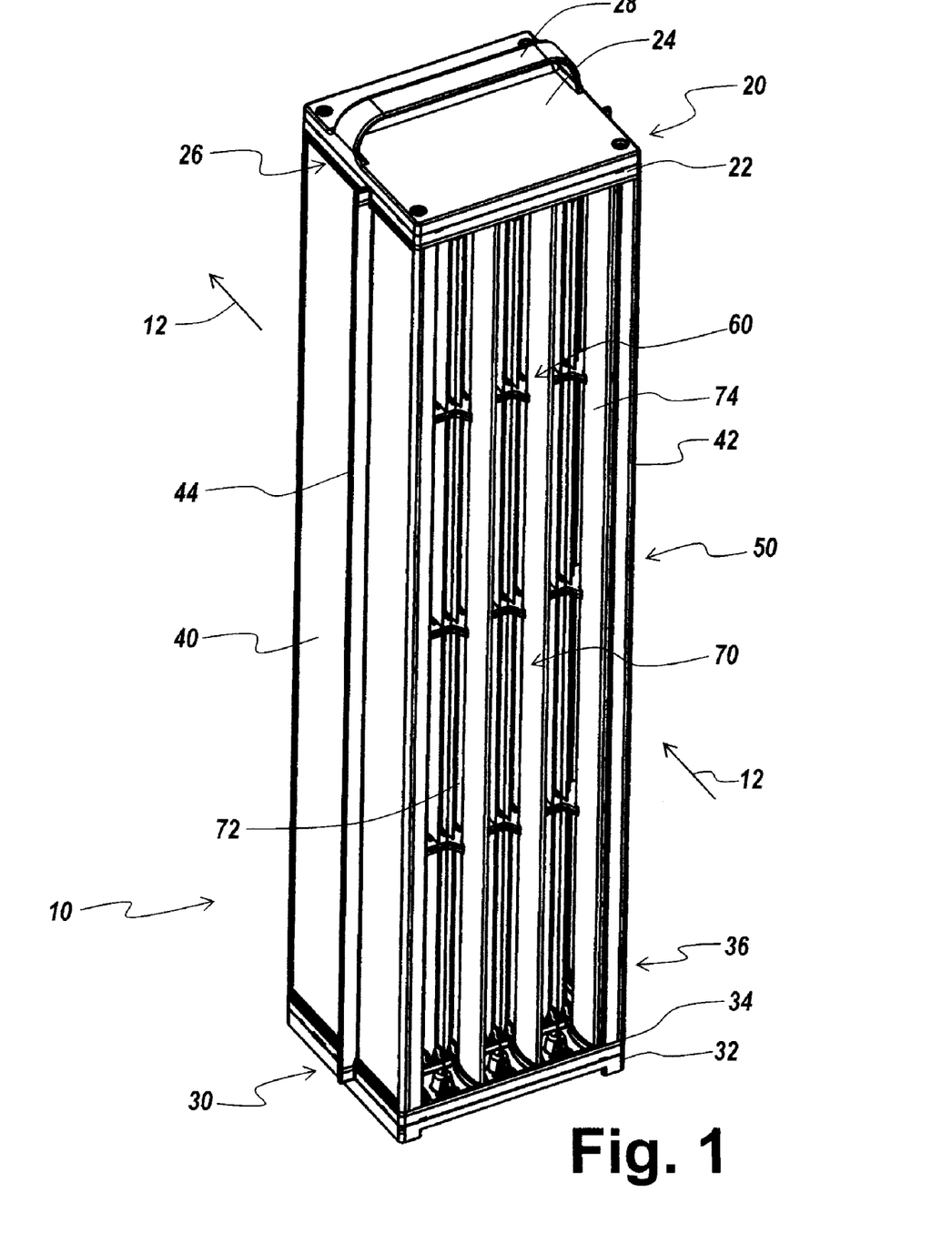
FIG. 1 is a rear pictorial view of the electrostatic filter cartridge for a tower air cleaner in accord with the present invention showing it in its upended orientation.

Generally designated at 10 in FIG. 1 is a rear pictorial view of an electrostatic filter cartridge for a tower air cleaner in upended orientation in accord with the present invention. The electrostatic filter cartridge for a tower air cleaner 10 of the present invention preferably is longer than wide or deep, although any shape adapted for use with a tower air cleaner, not shown, may be employed. Any suitable tower air cleaner, such as a rectangular desktop style, cylindrical style or other, generally upstanding tower housing may be employed. In use, it preferably is slidably mounted through an opening, not shown, in the top of the tower air cleaner and stands upright therewithin. Preferably, the tower air cleaner includes a pivoting cover, not shown, that opens at its top to allow insertion and removal of the electrostatic filter cartridge 10. A plurality, preferably four (4) in one embodiment, of so-called muffin or computer fans mounted as a vertical line array to the tower air cleaner moves the air to be cleaned horizontally through rear and front grills, and therewith, through the filter cartridge 10, as schematically illustrated by arrows 12.

Figure 2:
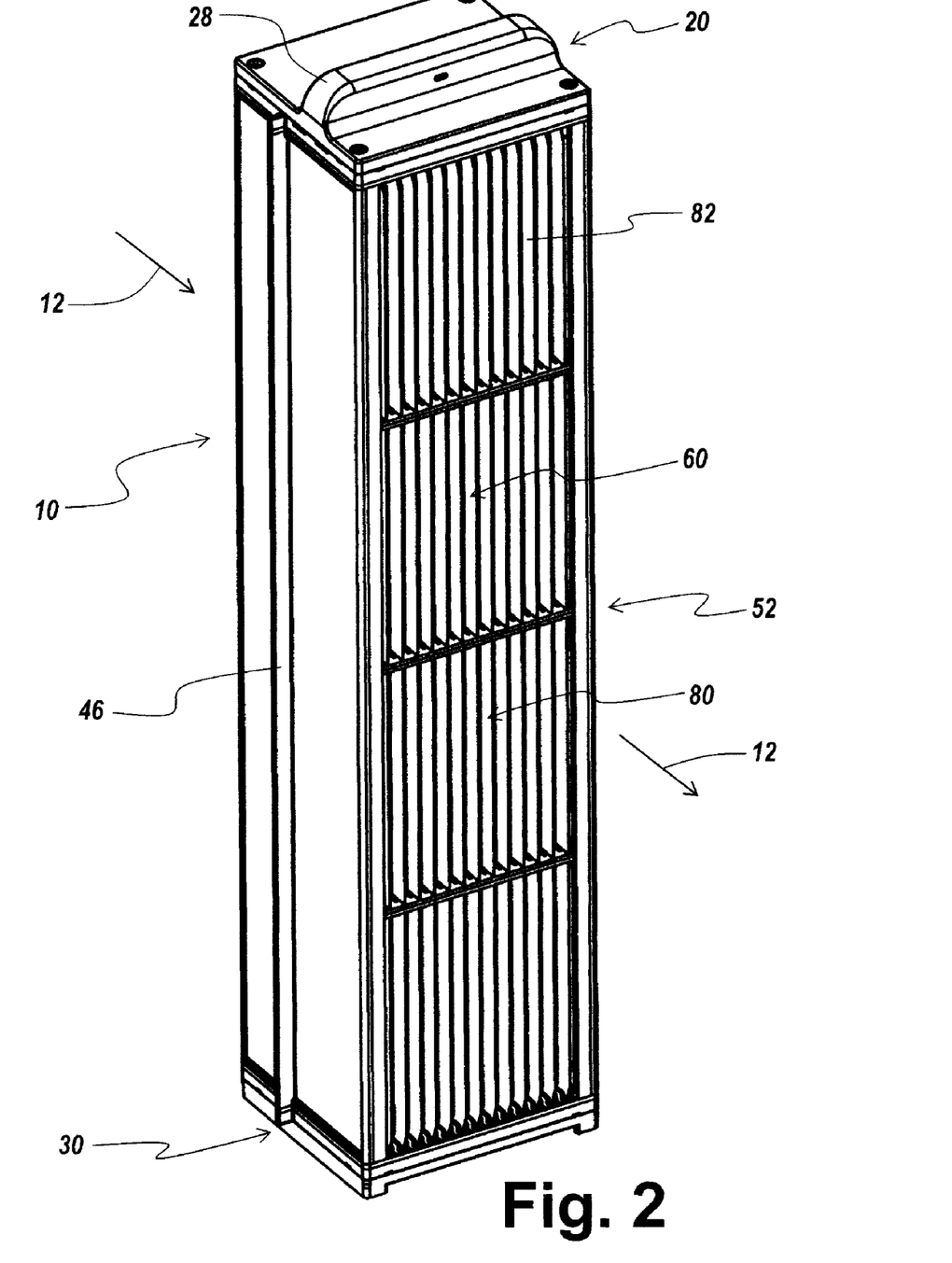
FIG. 2 is a front pictorial view thereof.

The elongated filter cartridge 10 includes longitudinally spaced top and bottom end caps generally designated 20, 30. The top end cap 20 includes mating, peripherally interfitting inner and outer plate members 22, 24 that enclose an interior plenum generally designated 26. The top end cap 20 includes a handle 28 that allows for its ease of insertion and removal into an out of the tower air cleaner. The bottom end cap 30 includes mating, peripherally interfitting inner and outer plate members 32, 34 that enclose an interior plenum generally designated 36. Rigid side panels 40, 42 are laterally attached at the edges of the top and bottom end caps 20, 30. Insertion and removal guide rails 44, 46 (best seen in FIGS. 1, 2) are integrally formed with the rigid side panels 40, 42. The filter cartridge 10 has open, generally rectangular rear and front faces generally designated 50, 52 (as best seen in FIGS. 1, 2).

Improved particulate collection efficiency electrode network generally designated 60 longitudinally extends between the top and bottom end caps 20, 30 laterally between the rigid side panels 40, 42 of the electrostatic filter cartridge 10. The electrode network 60 includes an emitter first array generally designated 70 and a collector second array generally designated 80 (FIG. 2) spaced apart along the airflow direction 12.

The emitter electrode first array 70 includes plural, preferably three (3), longitudinally extending emitter wires 72 and plural, preferably four (4), longitudinally extending ionizing, divider bars 74. The wires 72 and ionizing, divider bars 74 are supported by and extend between the top and bottom end caps 20, 30 such that each wire 72 is interdigited between laterally adjacent ionizing, divider bars 74 across the open rear face 50 of the filter cartridge 10. The collector electrode second array 80, as seen in FIG. 2, includes plural, preferably twenty-five (25), longitudinally extending, generally flat, rectangularly shaped plates 82 supported by and extending between the top and bottom end caps 20, 30 in laterally spaced relation between the side panels 40, 42. A different number of electrodes could be employed.

Figure 3:
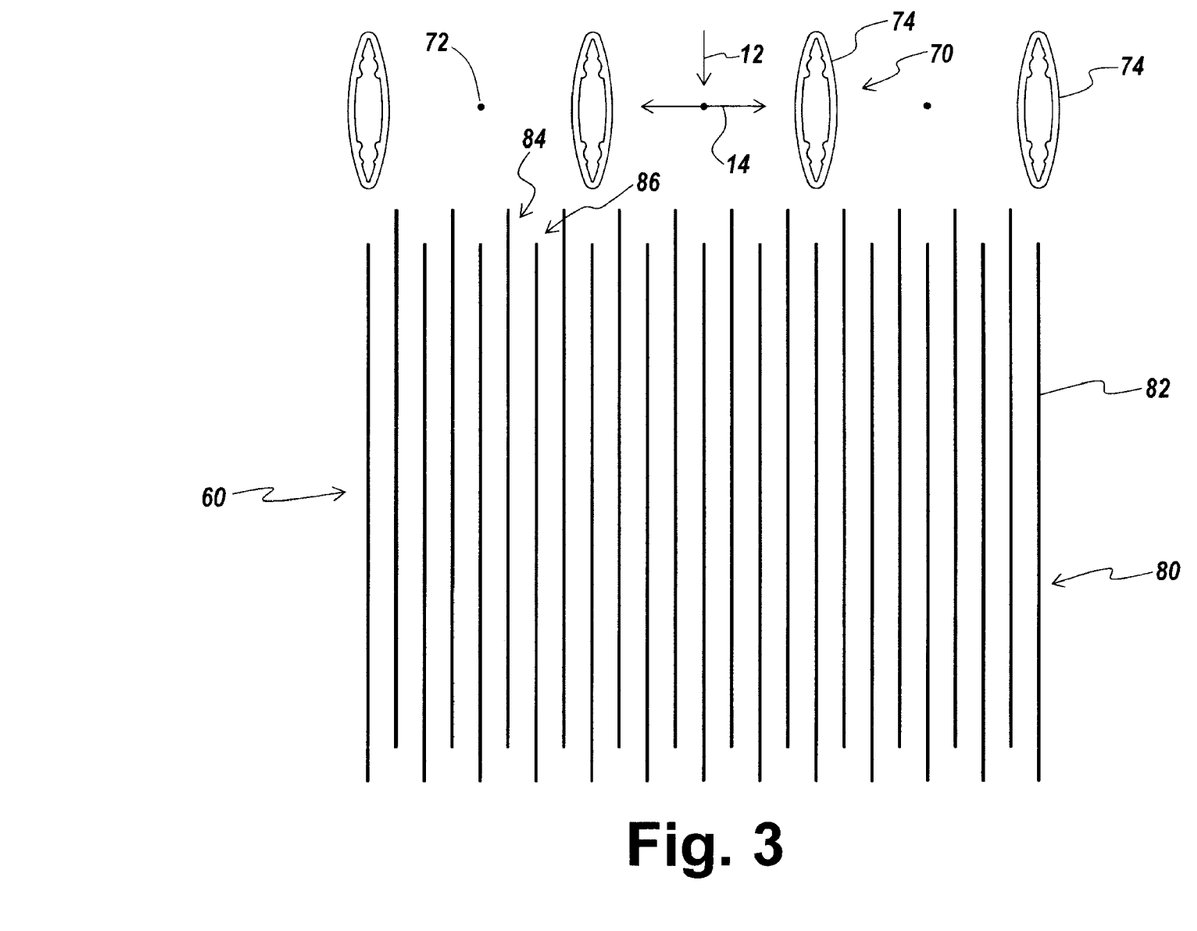
FIG. 3 is a schematic diagram useful in explaining the improved particulate collection efficiency electrode network of the electrostatic filter cartridge for a tower air cleaner of the present invention.

Each ionizing, divider bar electrode 74 has a bulbous, preferably air foil shape cross section (best seen in FIG. 3).

The ionizing, divider bars 74 preferably are of extruded aluminum; the plates 82 of the collector electrode array 80 are preferably stamped from stainless steel sheet or other easily, machine washable material; and the material of the side panels 40, 42, and inner and outer plates 22, 24, 32, 34 of the top and bottom end caps 20, 30, are preferably of readily machine washable and electrically insulative material, such as polycarbonate plastic. Other materials and/or manufacturing methods could be employed.

Referring now to FIG. 3, generally designated at 60 is a schematic diagram useful in explaining the improved particulate collection efficiency electrode network of the electrostatic filter cartridge for a tower air cleaner of the present invention. The emitter and collector first and second arrays 70, 80 of the electrode network 60 are in spaced apart relation along the airflow direction 12. The emitter electrode first array 70 includes preferably tungsten wire electrodes 72 and preferably aluminum extrusion ionizer bars 74 of preselected nonlinear cross sectional profile that are spaced apart in a direction transverse to the airflow direction schematically illustrated by arrow 14 such that each wire electrode 72 is spaced from and interdigited between laterally adjacent ionizer bars 74 in such a way that each emitter wire 72 confronts its laterally adjacent ionizer bars 74 where each is of maximized cross-sectional profile. The preselected nonlinear cross-sectional profile of the ionizer bars 74 is selected to be thicker at its midpoint and thinner at at least its leading edge, preferably is air foil shaped, and is thicker at its midpoint and thinner at both its leading and trailing edges, as illustrated. Any nonlinear cross-sectional profile may be selected so long as the surfaces of the ionizer bars are closer to the wire electrodes interdigited therebetween in regions of thicker cross-section, to promote ionization, and are farther from the wire electrodes in regions of thinner cross-section, so as not to block airflow. The collector electrode second array 80 includes parallel, interdigited collector plates 82, preferably of stainless steel or other machine washable material, that may be economically fabricated out of blank sheet material such as by stamping.

In the preferred embodiment, the three (3) tungsten emitter wires 72 are held at about seven thousand (7000) volts; the four (4) aluminum extrusion ionizing divider bars are held at zero (0) volts and the twenty-five (25) stainless steel collector plates are arranged in banks generally designated 84, 86 that are offset along the airflow direction 12 and electrically biased such that the bank 84 closest to the emitter array is held at about three thousand five hundred (3500) volts while the bank 86 more remote from the emitter array is held at zero (0)

volts. Other ionization potentials and any suitable high-voltage generator well known to those of skill in the art to produce them may be employed.

The ionizing, divider bars 74 are the primary target for the ions produced by the emitter wires 72, because they are the closest, highest potential target for the ions emitted by the wires. The collector plates 82 are a secondary target for the ions produced by the emitter wires 72; the bank 84 of plates 82 is at half the potential and further away from the emitter wires 72 than the ionizing bars 74 while the bank 86 of plates 82 at the same potential as the ionizing divider bars 74 is even further away and is somewhat hidden from the emitter wires 72 by the offset in banks.

The ionizer bars of non-linear and preferably air foil shaped profile and wires of the emitter electrode first array 70 have been found to provide significantly improved particulate collection efficiency. The surfaces of greater cross-section of the nonlinear profile ionizing, divider bars 74 pull ions off the emitter wires 72 while the surfaces of lesser cross-section of the nonlinear profile ionizing, divider bars 74 do not restrict airflow with the result that in the direction 14 perpendicular to the airflow direction ion clouds are produced between the ionizing divider bars of density and distribution significantly improved relative to ionizing bars of uniform, generally linear profile. The clouds ionize any particulate material that may be entrained in the air moving through and between the ionizing divider plates 74. It is believed that because the air is thereby more fully saturated with charge, a higher proportion of particles in the air becomes ionized, which results in the observed significantly improved particulate collection efficiency. The entrained ionized particulates are carried by the airflow into the spaces between the collector electrodes 82.

The potential difference between the banks 84, 86 precipitates the particulates out of the airstream, which accumulate inside the collector electrode second array 80. Preferably the improved collection efficiency filter cartridge is provided with drainage means to be described providing improved drainability and therewith machine washability. It will be understood that the improved particulate collection efficiency may be practiced in any electrostatic filter cartridge for a tower or other air cleaner both machine washable and non-machine washable or with different drainage providing means in alternative embodiments.

The filter cartridge for a tower air cleaner of the present invention in one presently preferred embodiment is adapted to be readily machine washable so that it may be removed from the tower air cleaner and placed in the rack of a dishwasher for periodic cleaning, the pieces and components are designed and arranged to prevent intracartridge fluid buildup or retention after washing, thereby eliminating any electrical shorting or arcing or other undesirable phenomena resulting therefrom that could interfere with the operation of the electrostatic filter cartridge. After cleaning, it is then replaced back into the tower air cleaner for use in cleaning home or office air. The electrostatic filter cartridge for a tower air cleaner may be in its upended orientation when inside a tower air cleaner and may be turned on any side when placed inside a washing machine such as the tray of a home or office dishwasher. Of course, the drainage providing means of the present invention may be employed in an electrostatic precipitator cartridge for a tower air cleaner having any electrode network known to those of skill of the art that is adapted to provide ionization and electrostatic precipitation of dirt, dust, allergens and other particulates.

Figure 4:
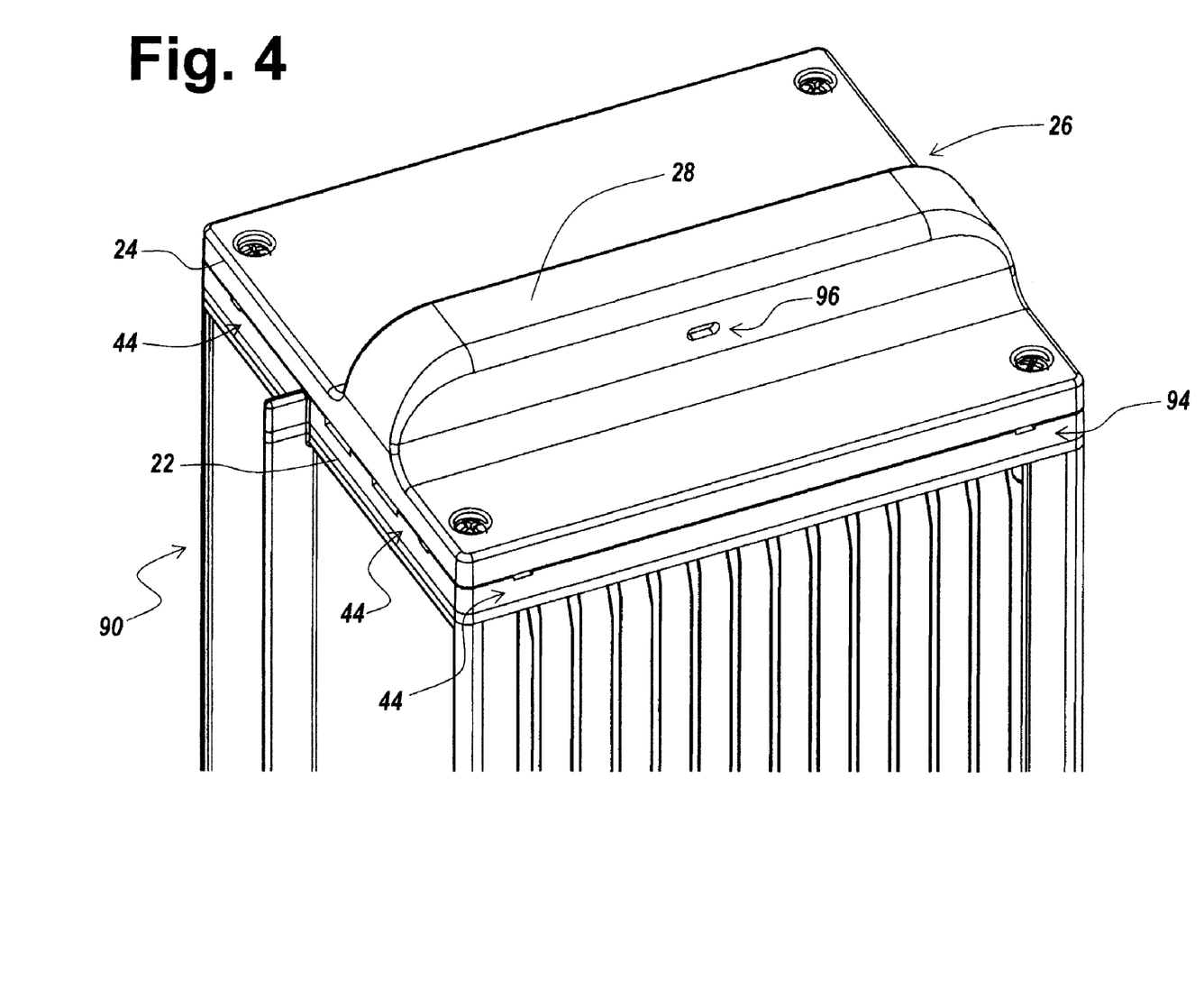
FIGS. 4 and 5 respectively are detailed rear and front pictorial views of the top end cap the electrostatic filter cartridge for a tower air cleaner of the present invention.
Figure 5:
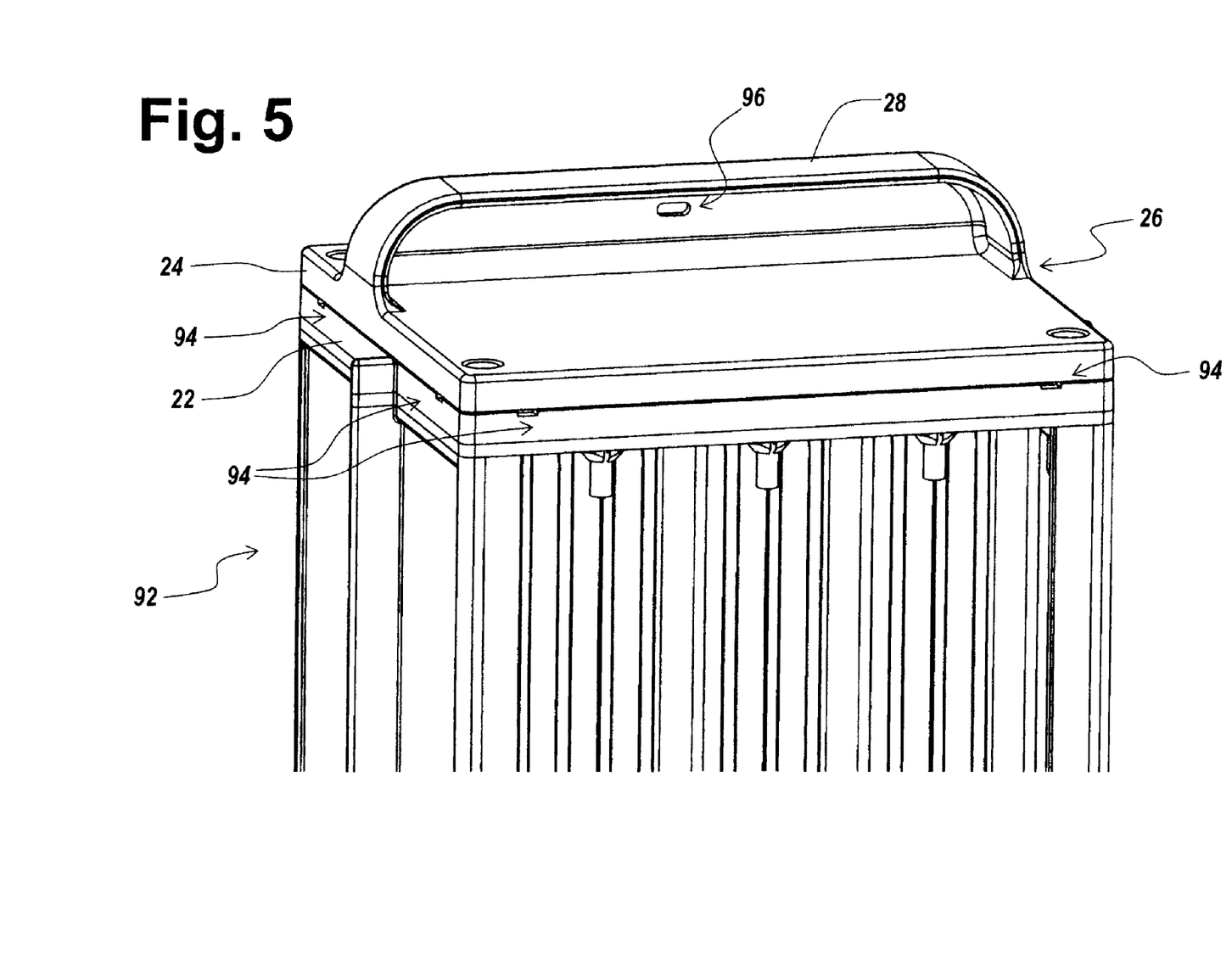

Referring now to FIGS. 4 and 5, generally designated at 90 and 92 are detailed front and rear pictorial views respectively of the top end cap of the electrostatic filter cartridge for a tower air cleaner of the present invention. Each of the side walls of the inside plate 22 are provided with openings generally designated 94 in fluid communication with the interior plenum 26 out of which water that may have been collected in the plenum during cleaning may drain when the electrostatic filter cartridge is turned on any of its sides. Although openings 94 in the side walls of the inside plate 22 are preferred, any suitable means to provide water drainage when the electrostatic filter cartridge is displaced on any of its sides may be employed. The outside plate 24 is provided with an opening generally designated 96 that prevents water accumulation within the handle 28. Although opening 96 in the handle of the outside plate 24 is preferred, any handle adapted to provide water drainage may be employed.

Figure 6:
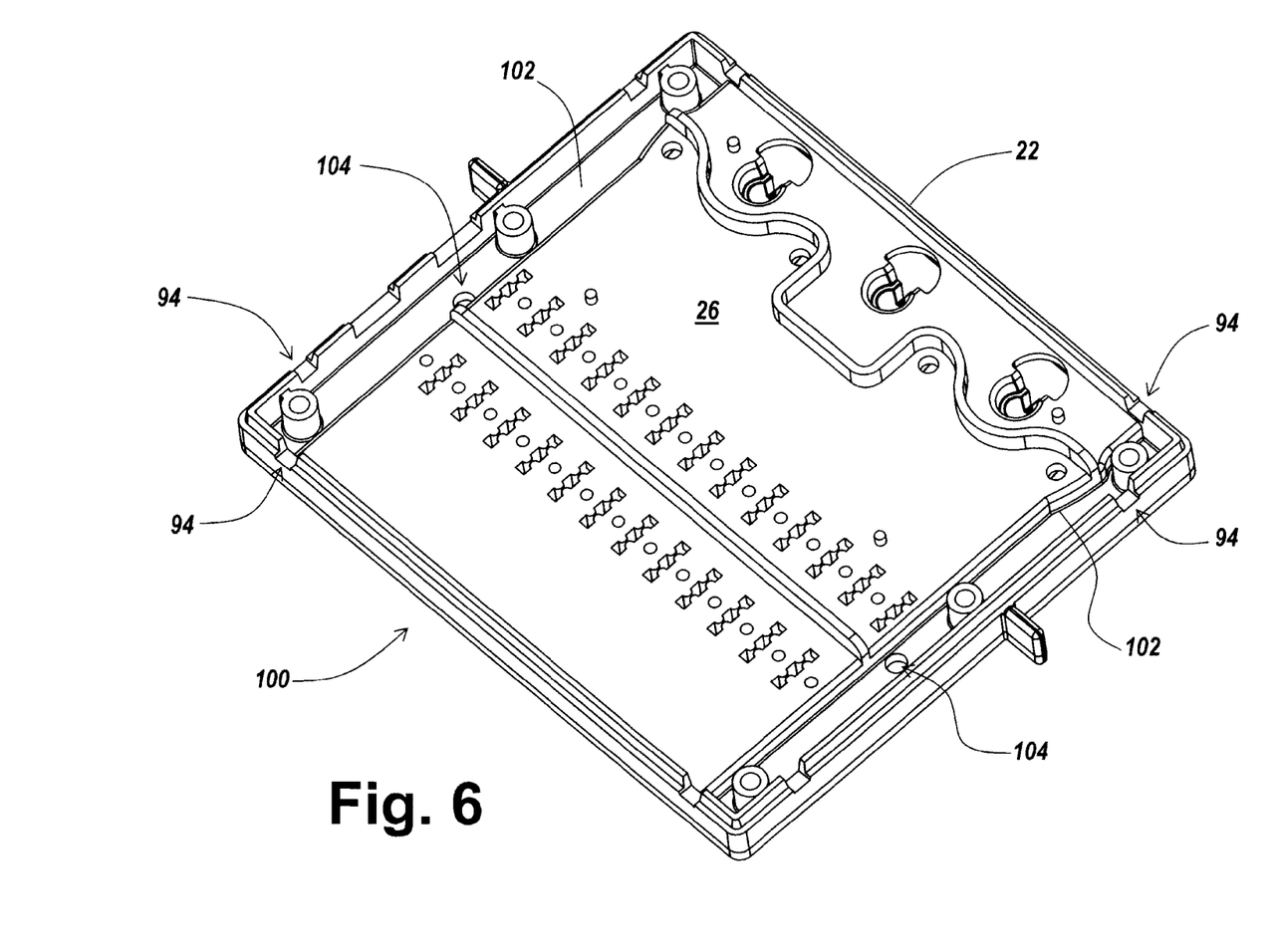
FIG. 6 is a pictorial view of the exterior surface of the inner plate of the top end cap.
Figure 7:
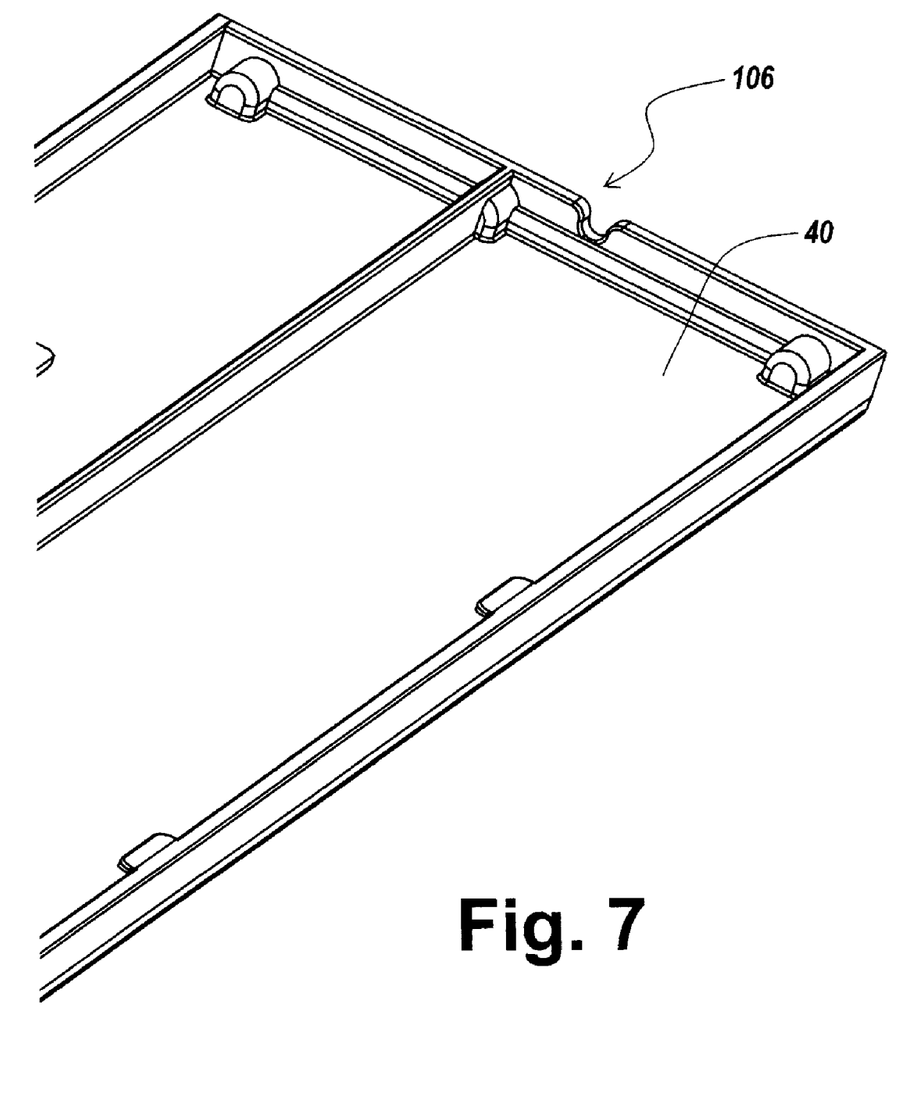
FIG. 7 is a detailed pictorial view of the side wall panel.

Referring now to FIG. 6, generally designated at 100 is a pictorial view of the exterior surface of the inner plate 22 of the top end cap of the electrostatic filter cartridge for a tower cleaner of the present invention (and of the inner plate 32 of the bottom end cap, which is identical). The inner plate 22 includes walls 102 defining openings generally designated 104 in fluid communication with the interior plenum 26 out of which water that may have been collected in the plenum during cleaning may drain when the electrostatic filter cartridge has been upended. Openings generally designated 106 aligned with the openings 104 of the inner plate 22 are provided through the walls of the side panels 40, as shown in FIG. 7, to allow water to drain from the plenum 26 of the top end cap 20, also when the filter cartridge is in its upended condition. Although drain openings provided through the bottommost wall of the inner plate 22 of the top end cap aligned with openings through the confronting end walls of the side panels are preferred, a different arrangement may be employed to allow water that may have been collected in the interior plenum to drain when the replaceable filter cartridge has been upended after cleaning.

Figure 8:
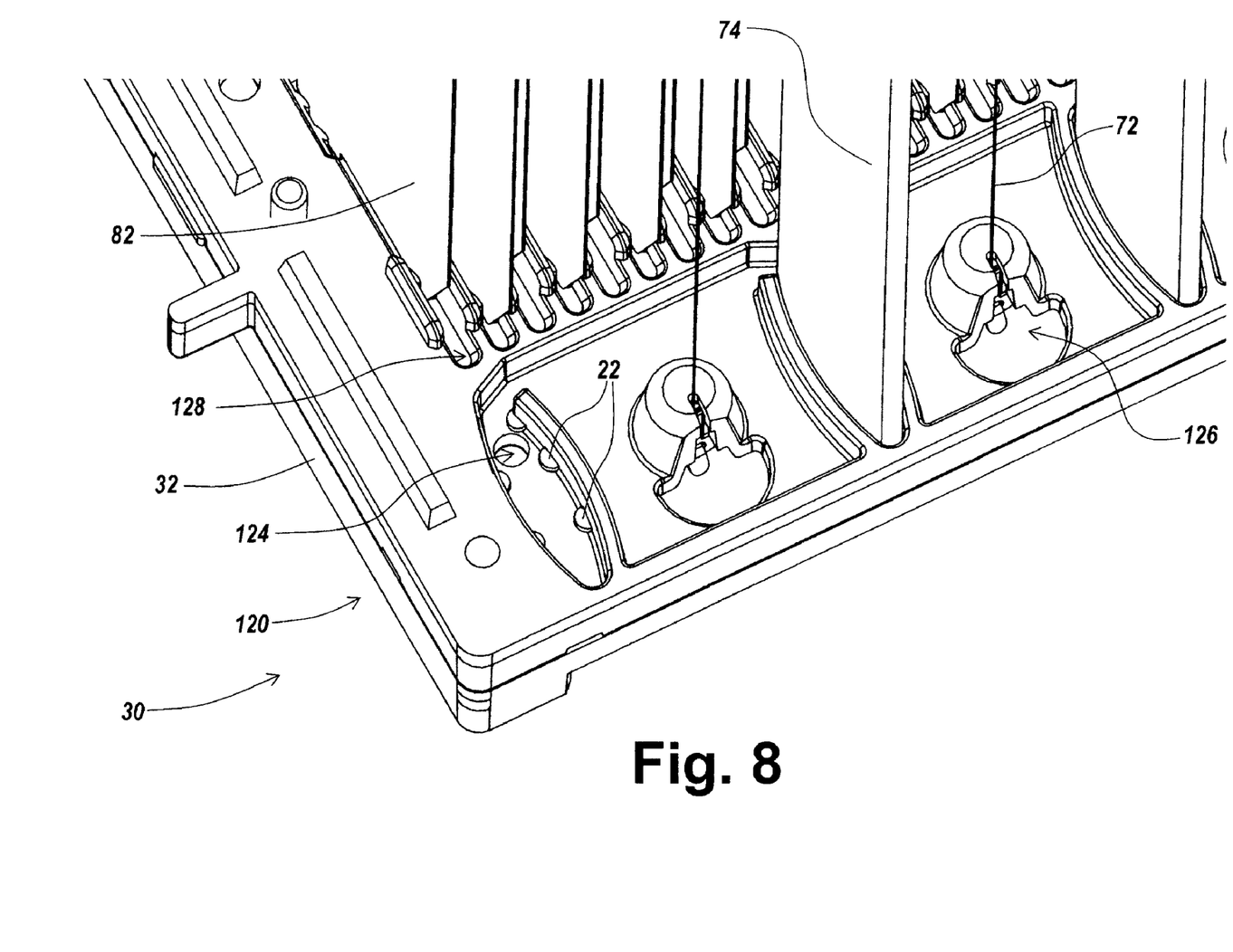
FIG. 8 is a detailed pictorial view of the interior surface of the inner plate of the bottom end cap of the electrostatic filter cartridge for a tower air cleaner of the present invention.

Referring now to FIG. 8, generally designated at 120 is a detailed pictorial view of the interior surface of the inner plate 32 of the bottom end cap 30 of the electrostatic filter cartridge for a tower air cleaner of the present invention (and also of the inner plate of the top end cap, which is identical). The interior surface of the inner plate 32 includes standoff pads 122 so that the ionizing, divider bars 74 are not tightly sealed to the confronting face of the inner plate 32 to allow drainage to occur through screw hole opening generally designated 124 when the filter cartridge has been upended after cleaning. The interior surface of the inner plate 32 of the bottom end cap 30 also drains through openings generally designated 126 that, as well as for drainage, are provided thereinthrough to allow installation of the emitter wires 72. The walls 128 providing throughholes for the collector plates 82 are sloped to provide water drainage thereinthrough when the filter cartridge has been upended after cleaning. Although standoff pads and ionizer bar drain openings, wire electrode drain openings, and sloped walls are respectively provided through the inner plate 32 of the bottom end cap 30, a different arrangement to provide drainage from the hollow extruded ionizing divider bars, wire electrodes and collector plates may be employed to drain the replaceable filter cartridge after it has been upended after cleaning.

Figure 9:
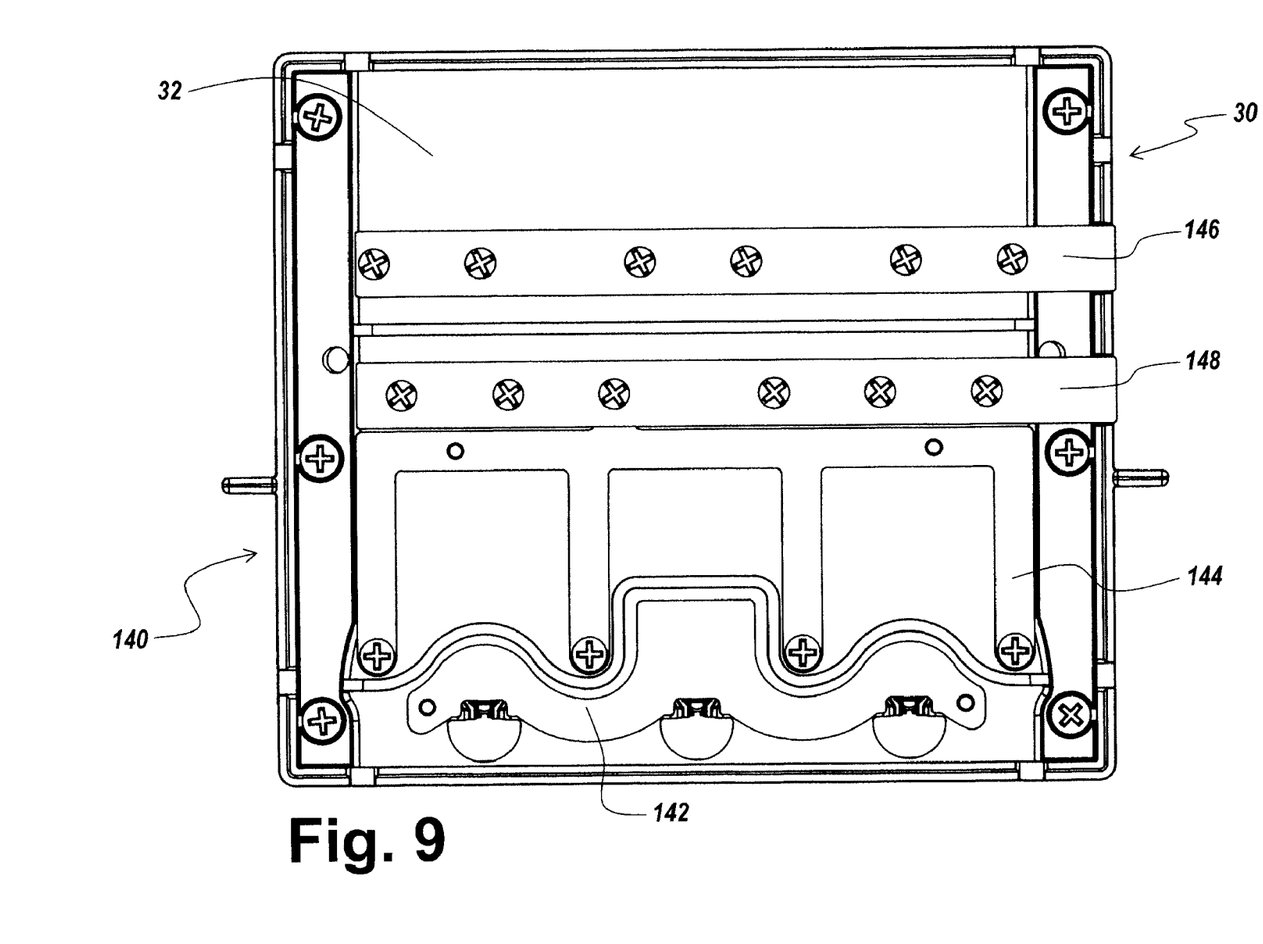
FIG. 9 is a plan view of the exterior surface of the inner plate of the bottom end cap of the electrostatic filter cartridge for a tower air cleaner of the present invention.

The interior surface of the outer plate 32 of the bottom end cap 30 is generally designated at 140 in FIG. 9. The electrical terminals 142, 144 maintain the wire electrodes and ionizing divider bars of the emitter electrode first array respectively at their common potential and the electrical terminals 146, 148 maintain the banks of offset collector plates of the collector electrode second array respectively at their common potential.

Figure 10:
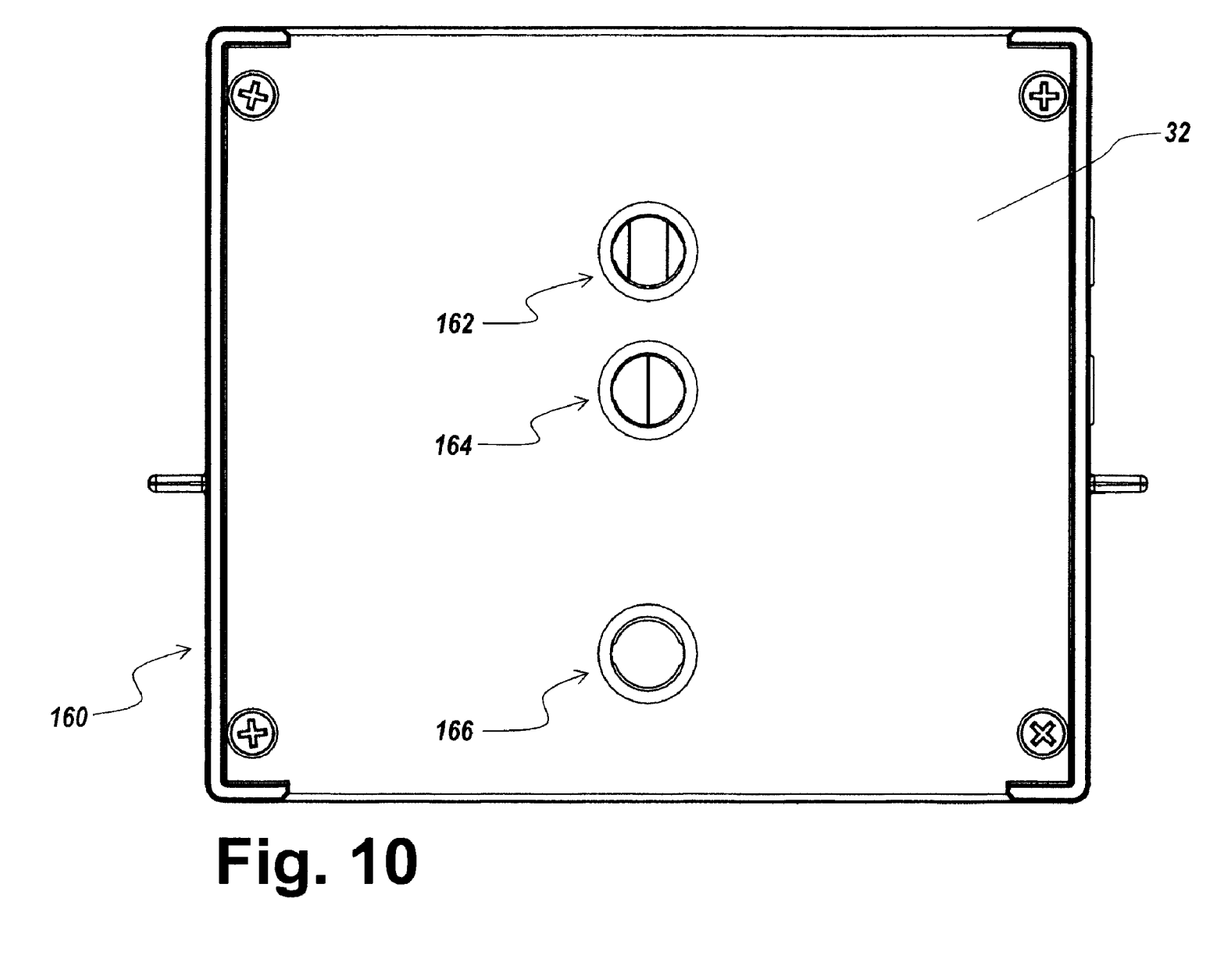
FIGS. 10 and 11 respectively show plan and pictorial views of the exterior and interior surfaces of the outer plate of the bottom end cap of the electrostatic filter cartridge for a tower air cleaner in accord with the present invention.
Figure 11:
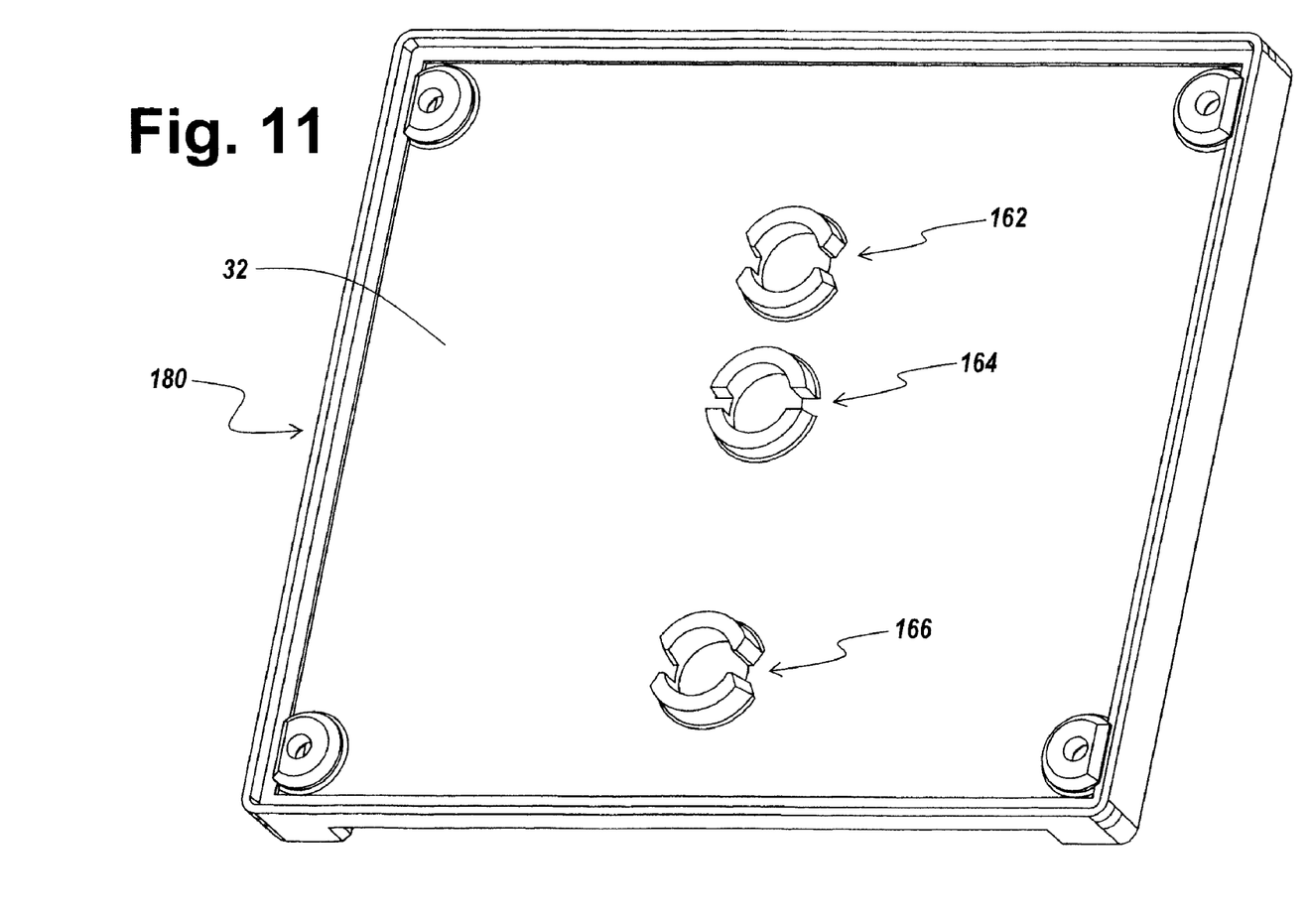

The exterior surface of the outer plate 32 of the bottom end cap 30 is generally designated at 160 in FIG. 10. The openings generally designated 162, 164, 166 provide access to the terminals 142, 144, 146. The interior surface of the outer plate 32 is designated generally at 180 in FIG. 11. Although openings aligned with the terminal electrodes are preferred, any suitable means for contacting the terminals with electrical potential from the high-voltage generator may be employed.

Many modifications of the presently disclosed invention will become apparent to those of skill in the art without departing from the inventive concepts.

What is claimed is:

1. An electrostatic filter for a tower air cleaner providing improved cleanability and improved particulate collection that is in upended orientation when inside said tower air cleaner and in side orientation when placed on its side inside a washing machine for cleaning, comprising:
   a cartridge elongated along a longitudinal direction and adapted for use with said tower air cleaner;
   said elongated cartridge including longitudinally spaced top and bottom end caps, rigid side panels connected at the lateral edges of the top and bottom end caps and open front and rear faces through which air to be cleaned is streamed along an airflow direction that is generally perpendicular to the open front and rear faces;
   an improved particulate collection efficiency electrode network including emitter and collector electrode first and second arrays spaced apart along the airflow direction that extend between and are supported by the longitudinally spaced top and bottom end caps;
   said emitter electrode first array includes wire electrodes and ionizing divider bars of a preselected nonlinear profile spaced apart in a direction transverse to the airflow direction such that each wire electrode is spaced from and interdigited between laterally adjacent ionizing divider bars and in such a way that the surfaces of the ionizing divider bars are closer to the wire electrodes interdigited therebetween in regions of thicker cross-section, to promote ionization, and are farther from the wire electrodes in regions of thinner cross-section, so as not to block airflow; and
   means coupled to said cartridge for providing drainage of cleaning water that may have accumulated therein when cleaned inside said washing machine when the cartridge is in said upended orientation or said side orientation after cleaning in said washing machine so as to prevent intracartridge fluid retention and thereby to eliminate electrical shortages or other undesirable phenomena resulting therefrom.

2. The electrostatic filter for a tower air cleaner of claim 1, wherein said cartridge is shaped as a rectangular solid having a square cross-section, and wherein said open front and rear faces are open, generally rectangular front and rear faces.

3. The electrostatic filter for a tower air cleaner of claim 2, wherein said end caps and side panels are fashioned of a preselected material selected to prevent electrical breakdown and to be dishwasher safe.

4. The electrostatic filter for a tower air cleaner of claim 3, wherein said preselected material is polycarbonate plastic.

5. The electrostatic filter for a tower air cleaner of claim 1, wherein said ionizing divider bars of preselected nonlinear profile is an air foil shaped nonlinear profile.

6. The electrostatic filter for a tower air cleaner of claim 5, wherein said air foil shaped nonlinear profile of said ionizing divider bars of preselected nonlinear profile is thicker at its midpoint and thinner at both its leading and trailing edges.

7. The electrostatic filter for a tower air cleaner of claim 1, wherein said collector electrode second array includes parallel interdigited collector plates.

8. The electrostatic filter for a tower air cleaner of claim 7, wherein said parallel interdigited collector plates of said collector electrode second array is arranged in banks offset along the airflow direction.

9. The electrostatic filter for a tower air cleaner of claim 7, wherein said collector electrodes of said collector electrode second array are of machine washable material.

10. The electrostatic filter for a tower air cleaner of claim 9, wherein said machine washable material is stainless steel.

11. The electrostatic filter cartridge for a tower air cleaner of claim 1, wherein said drainage providing means includes first walls respectively in said top and bottom end caps that define interior plenums in which water may collect during cleaning of the electrostatic filter cartridge; second walls respectively in said top and bottom end caps that define first openings in fluid communication with each said interior plenum out of which water that may have been collected in each said plenum during cleaning may drain when the electrostatic filter cartridge has been upended in said upstanding orientation; and third walls respectively in said top and bottom end caps defining second openings in fluid communication with each said interior plenum out of which water that may have been collected in each said plenum during cleaning may drain when the electrostatic filter cartridge is turned on its side in said side orientation.

12. The electrostatic filter cartridge for tower air cleaner of claim 11, further including fourth walls defining third openings in said side panels aligned with said first openings to provide fluid drainage when in said upended orientation.

13. An electrostatic filter for a tower air cleaner providing improved particulate collection efficiency, comprising:
   a cartridge elongated along a longitudinal direction and adapted for use with said tower air cleaner;
   said elongated cartridge including longitudinally spaced top and bottom end caps, rigid side panels connected at the lateral edges of the top and bottom end caps and open front and rear faces through which air to be cleaned is streamed along an airflow direction that is generally perpendicular to the open front and rear faces; and
   an improved particulate collection efficiency electrode network including emitter and collector electrode first and second arrays spaced apart along the airflow direction that extend between and are supported by the longitudinally spaced top and bottom end caps;
   said emitter electrode first array includes wire electrodes and ionizing divider bars of a preselected nonlinear profile spaced apart in a direction transverse to the airflow direction such that each wire electrode is spaced from and interdigited between laterally adjacent ionizing divider bars and in such a way that the surfaces of the ionizing divider bars are closer to the wire electrodes interdigited therebetween in regions of thicker cross-section, to promote ionization, and are farther from the wire electrodes in regions of thinner cross-section, so as not to block airflow.

14. The electrostatic filter for a tower air cleaner of claim 13, wherein said ionizing divider bars of preselected nonlinear profile is an air foil shaped nonlinear profile.

15. The electrostatic filter for a tower air cleaner of claim 14, wherein said air foil shaped nonlinear profile of said ionizing divider bars of preselected nonlinear profile is thicker at its midpoint and thinner at both its leading and trailing edges.

* * * * *